(12) United States Patent
James

(10) Patent No.: US 9,635,951 B2
(45) Date of Patent: May 2, 2017

(54) PILLOW RETENTION ASSEMBLY

(71) Applicant: Sharon James, Merced, CA (US)

(72) Inventor: Sharon James, Merced, CA (US)

( * ) Notice: Subject to any disclaimer, the term of this patent is extended or adjusted under 35 U.S.C. 154(b) by 14 days.

(21) Appl. No.: 14/743,154

(22) Filed: Jun. 18, 2015

(65) Prior Publication Data
US 2016/0367035 A1 Dec. 22, 2016

(51) Int. Cl.
| | | |
|---|---|---|
| *A47F 7/00* | (2006.01) | |
| *A47F 7/16* | (2006.01) | |
| *A47F 5/00* | (2006.01) | |
| *A47C 21/02* | (2006.01) | |
| *F16B 2/22* | (2006.01) | |
| *A47F 7/30* | (2006.01) | |
| *A47G 9/02* | (2006.01) | |

(52) U.S. Cl.
CPC .............. *A47C 21/026* (2013.01); *A47F 7/16* (2013.01); *A47F 7/30* (2013.01); *F16B 2/22* (2013.01); *A47G 9/0253* (2013.01)

(58) Field of Classification Search
CPC ....... A47C 21/00; A47C 21/02; A47C 20/027; A47C 21/026; A47C 21/022; A47C 21/024; A47C 21/028; A47C 16/005; F16B 2/20; F16B 2/22; A61G 7/05; A47F 7/00; A47F 7/0042; A47F 7/16; A47F 7/163; A47F 5/0884; A47F 7/143; A47F 7/30; A47F 7/175; A47F 7/0007; A47F 5/13; A47F 5/10; A47F 5/0062; A47F 5/0056; A47G 9/0253; A47G 9/10; A47G 9/1009; A47G 9/1072; A47G 9/00

USPC ....... 211/27, 183, 106.01, 182, 41.7, 45, 50, 211/181.1, 52, 55, 59.4, 12, 85.15, 211/119.006, 28; 5/633, 492, 662, 491, 5/507.1, 658, 632, 643; 248/230.7, 248/231.81, 316.7; 160/368.2
See application file for complete search history.

(56) References Cited

U.S. PATENT DOCUMENTS

| | | | | |
|---|---|---|---|---|
| 200,504 | A * | 2/1878 | Buell | A47C 20/027 5/633 |
| 214,800 | A * | 4/1879 | Adams | A47C 21/026 160/368.2 |
| 293,900 | A * | 2/1884 | Maynard | A47C 20/027 160/368.2 |
| 341,241 | A * | 5/1886 | Hickok | E06B 9/0623 160/160 |
| 413,214 | A * | 10/1889 | Van Cise | A47C 20/027 160/368.2 |
| 451,538 | A * | 5/1891 | Waite | A47C 21/026 160/368.2 |
| 471,895 | A * | 3/1892 | Reeves | A47C 20/027 5/634 |
| 583,196 | A * | 5/1897 | Hall | A47C 21/026 160/368.2 |
| 618,440 | A * | 1/1899 | Schrock | A47C 20/027 160/368.2 |
| 634,784 | A * | 10/1899 | Williams | E06B 9/521 160/327 |

(Continued)

*Primary Examiner* — Jennifer E Novosad

(57) ABSTRACT

A pillow retention assembly for displaying pillows on a bed includes a rack that may be positioned on a bed. A plurality of pillows may be positioned on the bed. A plurality of clips is provided and each of the clips is attached to the rack. Thus, each of the clips may engage an associated one of the pillows thereby retaining the pillows on the rack.

4 Claims, 3 Drawing Sheets

(56) References Cited

U.S. PATENT DOCUMENTS

| | | | | |
|---|---|---|---|---|
| 648,477 A * | 5/1900 | Williams | A47C 20/027 | 160/368.2 |
| 692,238 A * | 2/1902 | Coleman | A47C 21/026 | 160/338 |
| 695,555 A * | 3/1902 | Hebert | A47C 20/027 | 160/368.2 |
| 828,164 A * | 8/1906 | Williams | A47C 20/027 | 160/368.2 |
| 900,507 A * | 10/1908 | Francis | A47C 21/026 | 160/368.2 |
| 900,508 A * | 10/1908 | Francis | A47C 21/026 | 160/368.2 |
| 942,354 A * | 12/1909 | Ryan | A47C 20/027 | 5/617 |
| 982,558 A * | 1/1911 | Abbot | A47C 20/027 | 5/634 |
| 1,063,423 A | 6/1913 | Edelin | | |
| 1,072,654 A * | 9/1913 | Rorabeck | A47F 7/163 | 211/45 |
| 1,185,607 A * | 5/1916 | Templin | A47F 7/163 | 211/45 |
| 1,197,544 A * | 9/1916 | Rediske | A47F 7/00 | 211/13.1 |
| 1,270,156 A * | 6/1918 | Henderson | A47F 7/10 | 211/170 |
| 1,626,399 A * | 4/1927 | Fischer | A47F 7/08 | 12/53.7 |
| 2,027,799 A * | 1/1936 | Wharton | A47F 5/0884 | 211/70.7 |
| 2,116,386 A * | 5/1938 | Copeland | A47F 7/143 | 211/120 |
| 2,250,026 A * | 7/1941 | Laukhuff | A47C 20/027 | 297/377 |
| 2,488,903 A * | 11/1949 | Edwards | D06F 57/12 | 211/85.3 |
| 2,511,730 A * | 6/1950 | McClain | G03B 21/54 | 211/120 |
| 2,722,693 A * | 11/1955 | Wolf | A47C 21/08 | 5/280 |
| 2,839,200 A * | 6/1958 | Easterwood | B42F 15/06 | 211/182 |
| 3,237,215 A * | 3/1966 | Fried | A47C 20/027 | 5/632 |
| 3,329,979 A * | 7/1967 | Drapin | A47C 20/027 | 5/634 |
| 3,995,335 A * | 12/1976 | Neely | A47C 20/027 | 297/284.3 |
| 4,027,799 A * | 6/1977 | Stucker | A47F 7/12 | 211/106 |
| 4,938,368 A * | 7/1990 | Sharman | A47F 5/0876 | 211/57.1 |
| 5,027,956 A * | 7/1991 | Lotufo | A47F 7/163 | 211/45 |
| D324,966 S * | 3/1992 | Buffington | D6/680.2 | |
| 5,553,921 A * | 9/1996 | Schenk | A47C 7/42 | 297/252 |
| 5,601,193 A * | 2/1997 | Santoya | G09F 1/103 | 211/11 |
| 5,765,244 A * | 6/1998 | Heidler | A47C 20/043 | 5/630 |
| 6,045,107 A * | 4/2000 | Carlson | A47B 23/007 | 248/175 |
| D423,857 S | 5/2000 | Shea | | |
| D433,821 S * | 11/2000 | Brutus | D6/317 | |
| 6,308,837 B1 * | 10/2001 | Bragg | A47B 81/00 | 211/113 |
| 6,427,268 B1 | 8/2002 | Davis | | |
| 6,763,535 B1 | 7/2004 | Mann | | |
| 7,086,105 B1 * | 8/2006 | Gottlieb | A47C 21/026 | 5/492 |
| 8,602,228 B1 * | 12/2013 | Martinez | A47F 5/0093 | 211/100 |
| 2010/0122961 A1 * | 5/2010 | Moreau | A47G 25/16 | 211/85.7 |
| 2016/0106206 A1 * | 4/2016 | Williams | A47B 81/00 | 211/49.1 |

* cited by examiner

PILLOW RETENTION ASSEMBLY

BACKGROUND OF THE DISCLOSURE

Field of the Disclosure

The disclosure relates to retention devices and more particularly pertains to a new retention device for displaying pillows on a bed.

SUMMARY OF THE DISCLOSURE

An embodiment of the disclosure meets the needs presented above by generally comprising a rack that may be positioned on a bed. A plurality of pillows may be positioned on the bed. A plurality of clips is provided and each of the clips is attached to the rack. Thus, each of the clips may engage an associated one of the pillows thereby retaining the pillows on the rack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
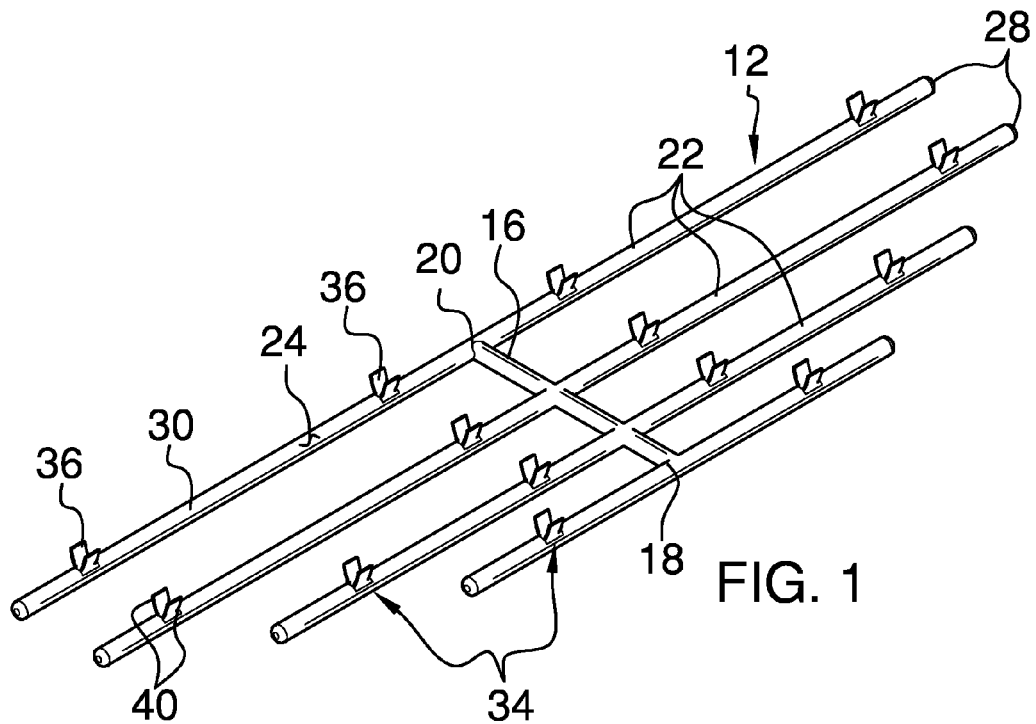
FIG. 1 is a top perspective view of a pillow retention assembly according to an embodiment of the disclosure.
Figure 2:
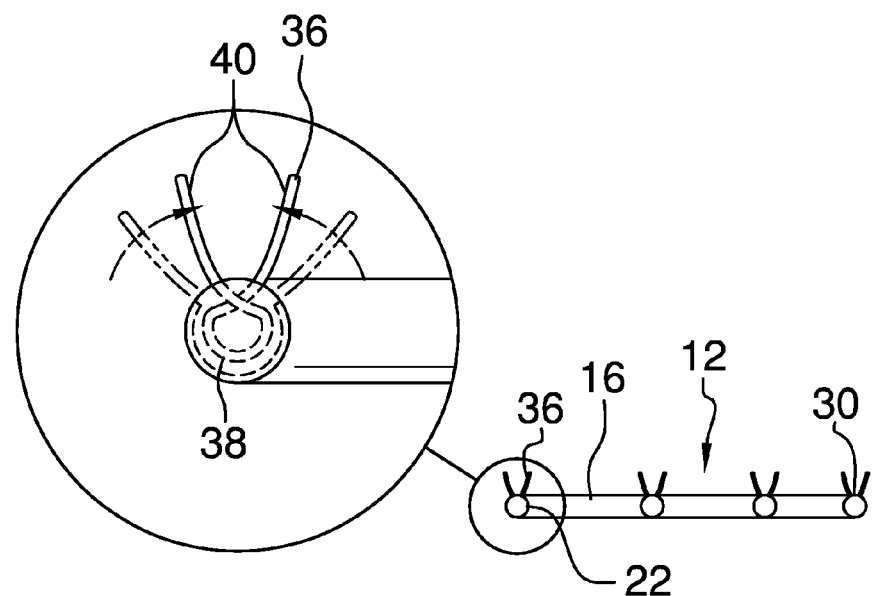
FIG. 2 is a right side view of an embodiment of the disclosure.
Figure 3:
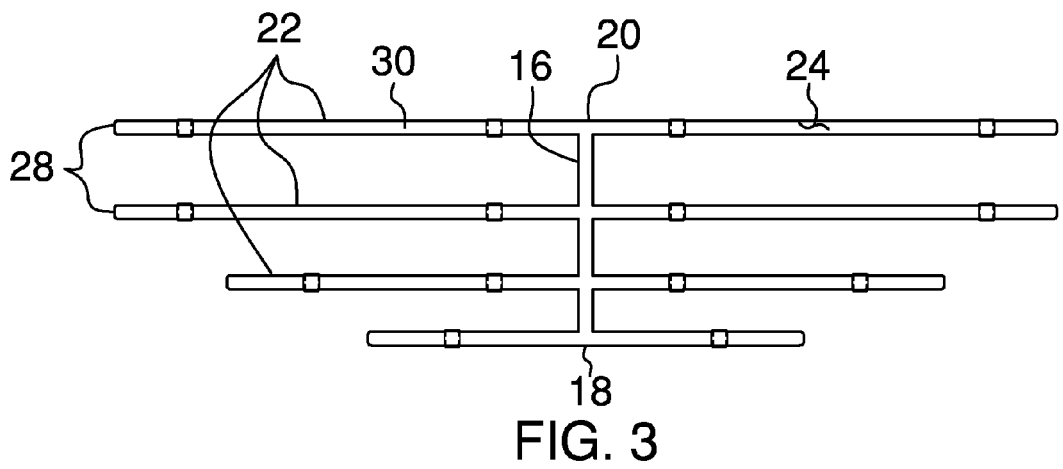
FIG. 3 is a top view of an embodiment of the disclosure.
Figure 4:
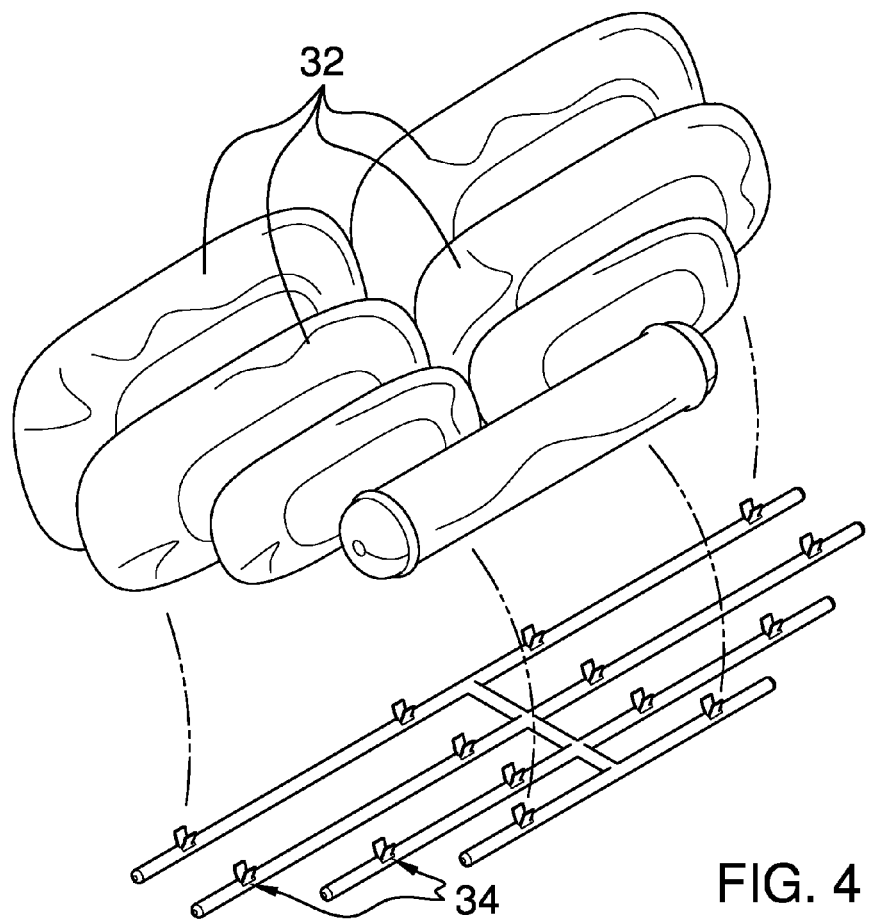
FIG. 4 is a perspective in-use view of an embodiment of the disclosure.
Figure 5:
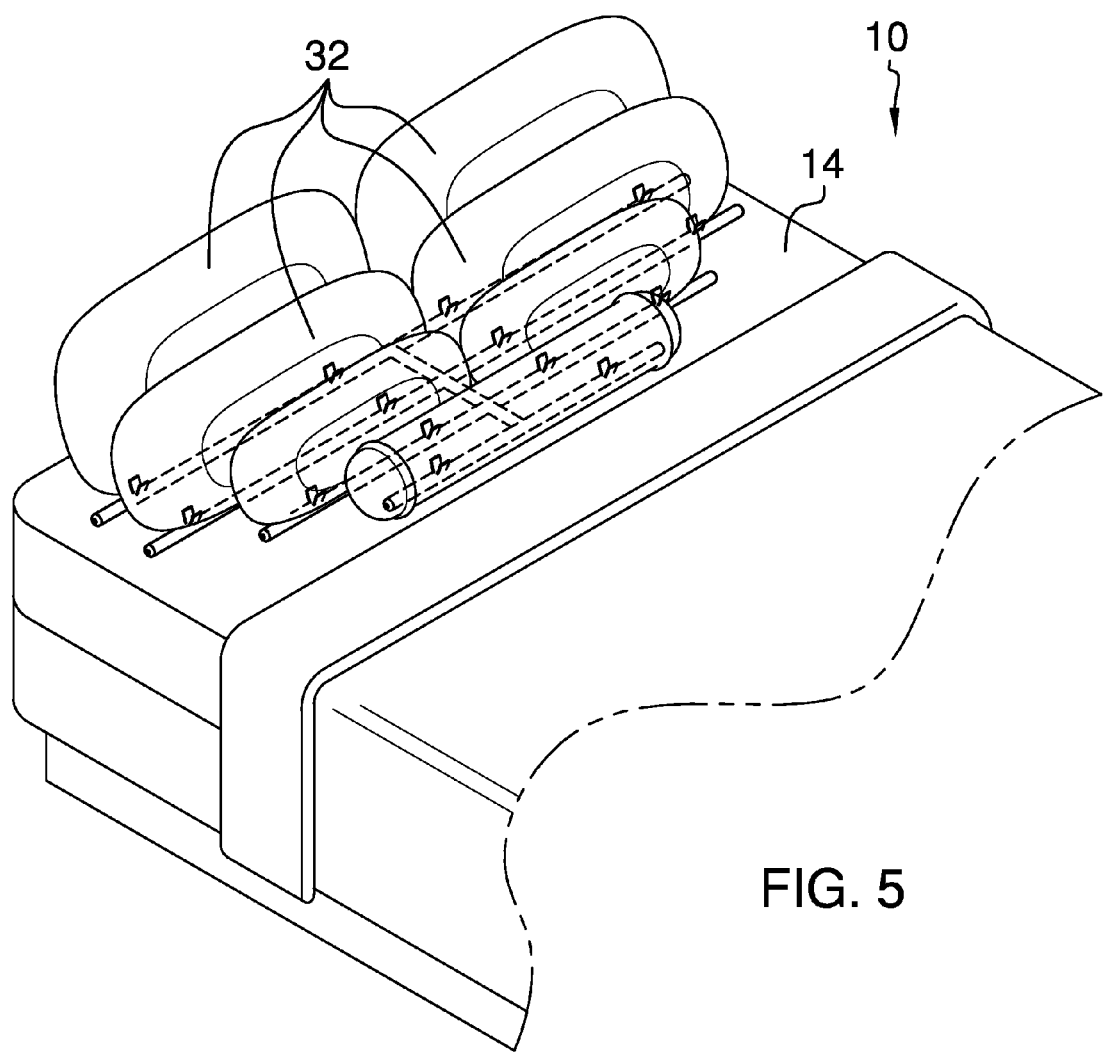
FIG. 5 is a top perspective in-use view of an embodiment of the disclosure.

With reference now to the drawings, and in particular to FIGS. 1 through 5 thereof, a new retention device embodying the principles and concepts of an embodiment of the disclosure and generally designated by the reference numeral 10 will be described.

As best illustrated in FIGS. 1 through 5, the pillow retention assembly 10 generally comprises a rack 12 that may be positioned on a bed 14. The bed 14 may be a bed for sleeping or the like. The rack 12 comprises a central member 16 that has a first end 18 and a second end 20 and a plurality of lateral members 22. Each of the lateral members 22 is coupled to and extends away from the central member 16 and each of the lateral members 22 has an outer surface 24 and a distal end 28 with respect to the central member 16. The outer surface 24 of each of the lateral members 22 has a top side 30 and the lateral members 22 are spaced apart from each other and distributed between the first end 18 and the second end 20.

The lateral members 22 have an increasing length between the first end 18 and the second end 20. Each of the lateral members 22 may have a one of a plurality of pillows 32 positioned thereon thereby facilitating the pillows 32 to be displayed on the bed 14. The pillows 32 may be pillows 32 of any conventional size and shape. Each of the lateral members 22 has at least one opening 34 extending through the outer surface 24. The at least one openings 34 are spaced apart from each other and distributed between the distal end 28 of an associated one of the lateral members 22 and the central member 16. Each of the at least one openings 34 is positioned on the top side 30 of the associated lateral member 22.

A plurality of clips 36 is provided and each of the clips 36 is attached to the rack 12. Thus, each of the clips 36 may engage an associated one of the pillows 32 thereby retaining the pillows 32 on the rack 12. Each of the clips 36 comprises a central coil 38 and a pair of arms 40. Each of the arms 40 extends away from the central coil 38 and each of the arms 40 is biased toward each other thereby facilitating the arms 40 to frictionally engage an associated one of the pillows 32. The central coil 38 of each of the clips 36 is positioned within an associated one of the lateral members 22 and the arms 40 of each of the clips 36 extends outwardly from an associated one of the at least one openings 34.

In use, the rack 12 is positioned on the bed 14 and each of the pillows 32 is positioned on a selected one of the lateral members 22. The arms 40 on each of the clips 36 are manipulated to be urged away from each other and the arms 40 are released to engage the associated pillow 32 thereby retaining the pillows 32 on the rack 12. The pillows 32 are arranged in any desired manner on the rack 12 thereby facilitating the pillows 32 to be displayed. Additionally, the rack 12 and the pillows 32 are removable from the bed 14 thereby facilitating the bed 14 to be slept in. The rack 12 and pillows 32 are positioned back on the bed 14 after the bed 14 has been slept in thereby facilitating the pillows 32 to be quickly arranged on the bed 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pillow retention assembly configured to retain a plurality of pillows in a selected arrangement, said assembly comprising:
    a rack configured to be positioned on a bed, said rack including a central member having a first end and a second end and a plurality of lateral members, each of said lateral members being coupled to and extending away from said central member, each of said lateral members having an outer surface and a distal end with respect to said central member, said outer surface of each of said lateral members having a top side, said lateral members being spaced apart from each other and distributed between said first end and said second end, said lateral members having an increasing length between said first end and said second end, each of said lateral members being configured to have one of the pillows positioned thereon thereby facilitating the pillows to be displayed on the bed; and
    a plurality of clips, each of said clips being attached to said rack wherein each of said clips is configured to engage an associated one of the pillows thereby retaining the pillow on said rack, each of said clips including a central coil and a pair of arms, each of said arms extending away from said central coil, each of said arms being biased toward each other wherein each of said arms is configured to frictionally engage the pillow.

2. The assembly according to claim 1, wherein each of said lateral members has at least one opening extending through said outer surface, each of said at least one openings being spaced apart from each other and distributed between said distal end of an associated one of said lateral members and said central member, each of said at least one openings being positioned on said top side of said associated lateral member.

3. The assembly according to claim 1, further comprising:
    each of said lateral members having at least one opening; and
    said central coil of each of said clips being positioned within an associated one of said lateral members having said arms of each of said clips extending outwardly from an associated one of said at least one openings.

4. A pillow retention assembly configured to retain a plurality of pillows in a selected arrangement, said assembly comprising:
    a rack configured to be positioned on a bed, said rack comprising:
        a central member having a first end and a second end, and
        a plurality of lateral members, each of said lateral members being coupled to and extending away from said central member, each of said lateral members having an outer surface and a distal end with respect to said central member, said outer surface of each of said lateral members having a top side, said lateral members being spaced apart from each other and distributed between said first end and said second end, said lateral members having an increasing length between said first end and said second end, each of said lateral members being configured to have one of the pillows positioned thereon thereby facilitating the pillows to be displayed on the bed, each of said lateral members having at least one opening extending through said outer surface, each of said at least one openings being spaced apart from each other and distributed between said distal end of an associated one of said lateral members and said central member, each of said at least one openings being positioned on said top side of said associated lateral member; and
    a plurality of clips, each of said clips being attached to said rack wherein each of said clips is configured to engage an associated one of the pillows thereby retaining the pillows on said rack, each of said clips comprising a central coil and a pair of arms, each of said arms extending away from said central coil, each of said arms being biased toward each other wherein each of said arms is configured to frictionally engage the pillow, said central coil of each of said clips being positioned within an associated one of said lateral members having said arms of each of said clips extending outwardly from an associated one of said at least one openings.

* * * * *